Patented Dec. 9, 1941

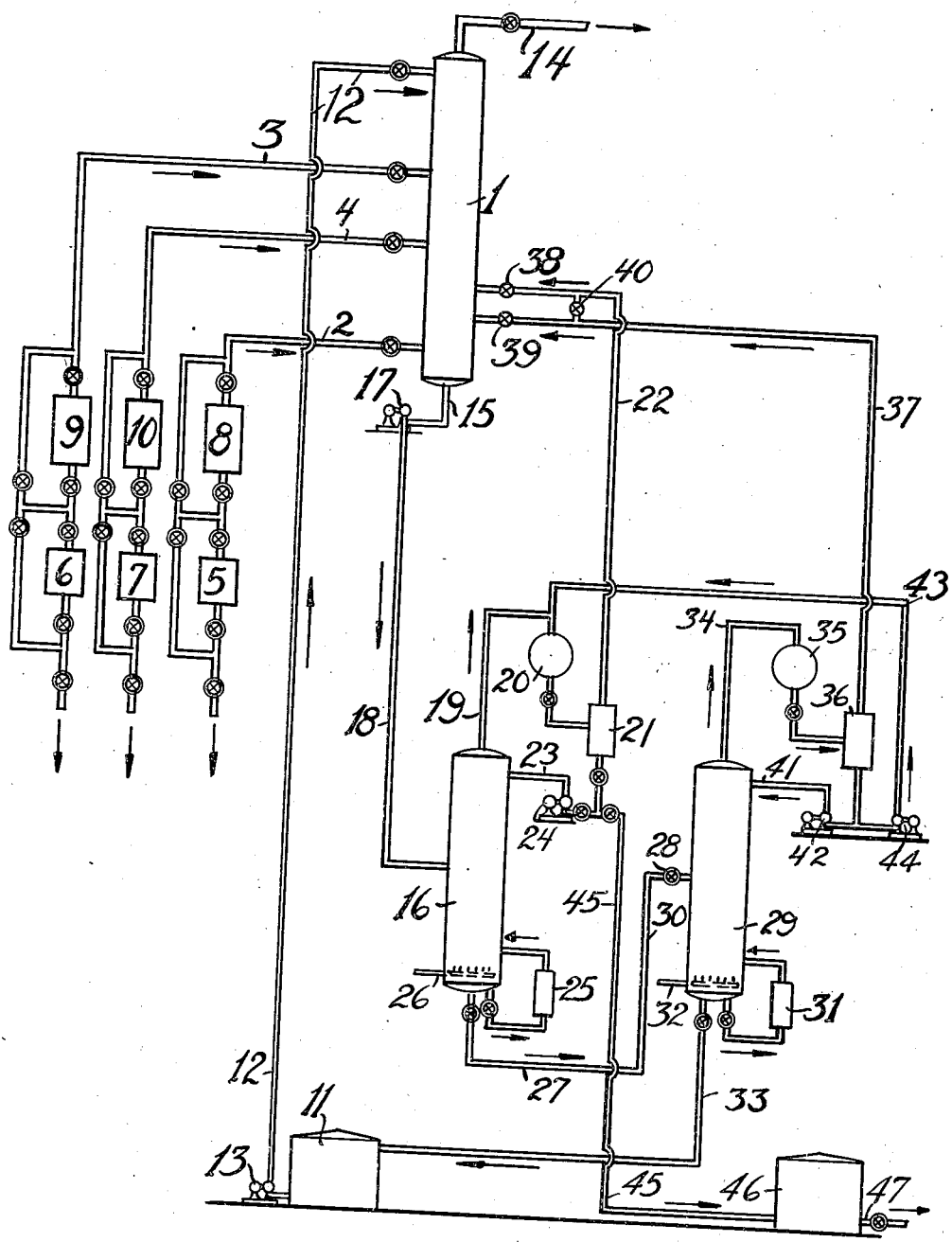

2,265,845

UNITED STATES PATENT OFFICE 2,265,845

GAS ABSORPTION TOWER OPERATION

Paul E. Kuhl, Madison, N. J., assignor to Standard Oil Development Company, a corporation of Delaware Application May 31, 1939, Serial No. 276,592

5 Claims. (Cl. 196—8)

The present invention relates to an improved process for the recovery of hydrocarbon vapors from fixed gases by oil absorption. The invention especially relates to a novel method for securing optimum operating conditions in the removal of hydrocarbon vapors from different gases in which the concentration of the hydrocarbon vapors is substantially different. In accordance with the process of the present invention, lean oil is introduced at the top of a counter-current absorption tower, gas relatively rich in hydrocarbon vapors is introduced at the bottom of the countercurrent absorption tower while gases relatively poorer in hydrocarbon vapors are introduced into the tower at points intermediate the point of introduction of the lean oil and the point of introduction of the relatively rich hydrocarbon gas in a manner that the concentration of the hydrocarbon vapors in the respective streams increases in the direction of the flow of the lean oil.

In the refining of petroleum oils, relatively large quantities of gas, varying widely in their hydrocarbon analysis, are produced. These gases include various concentrations of butanes, pentanes, and higher boiling hydrocarbons which due to their physical properties may be readily included in gasoline. It is, therefore, common refinery practice to recover butanes, pentanes, and the like, from the wet gases by various procedures. For example, it is well known in the art to recover from the so-called wet gases secured in the refining of petroleum, valuable liquid hydrocarbons by means of contacting said wet gases with an absorbent oil under suitable temperature and pressure conditions. In the usual oil absorption gasoline recovery operation, lean absorption oil is circulated in a countercurrent bubble cap tower or similar equipment in which it contacts a stream of gas containing butane, pentane, and higher boiling fractions. The lean absorption oil is introduced into the top of the absorber and the gas containing the valuable hydrocarbons is introduced in the bottom of the absorber.

In these absorption operations, the method usually employed is to select the lowest boiling hydrocarbon which it is desired to absorb and then to adjust the operating conditions to absorb the desired amount of this hydrocarbon. In an efficiently designed absorption tower, the partial pressure of this hydrocarbon in the absorption oil at the point of withdrawal will be substantially equivalent to the partial pressure of the hydrocarbon in the entering gas. This lowest boiling hydrocarbon, generally termed the "key" component, is usually butane. Thus the partial pressure of the butane in the hydrocarbon rich absorption oil at the point of withdrawal of the absorption oil is substantially equivalent to the partial pressure of the butane in the entering gas. Normally the partial pressure of components having higher boiling points than butane, as for example, pentane, hexane and the like contained in the hydrocarbon rich absorption oil leaving the absorber will be considerably less than the partial pressures of these constituents in the entering gas. This is due to an insufficient amount of these constituents in the inlet gas to give a concentration in the rich absorption oil to produce a partial pressure near that of the inlet gas.

Thus in order to secure an efficient operation when processing gases of substantially different concentration of valuable hydrocarbons, the usual process has been to process the respective gases in different towers having operating conditions adjusted for the particular gas being processed. This is uneconomical especially when there are numerous small streams of gases which comprise various amounts of recoverable petroleum hydrocarbons. Various suggestions have been made in order to overcome these disadvantages. For example, the suggestion has been made that the rich absorption oil leaving the absorber in which relatively poor hydrocarbon gases have been processed, be then used to extract relatively rich hydrocarbon gases or the gases containing a substantially higher concentration of valuable hydrocarbons. This is undesirable since an operation of this character requires a separate tower for each gas stream processed. It is also undesirable since all gases leaving the system do not contact fresh lean oil. The process of my invention overcomes these disadvantages and permits the optimum processing of various streams of gases in an efficient operation and requires the use of only one absorption tower.

The process of my invention may be readily understood by reference to the attached diagrammatical drawing illustrating one modification of the same. For purposes of illustration it is assumed that three gas streams having substantially different concentrations of recoverable hydrocarbons are to be processed. It is also assumed that the operation is to be conducted in order to recover hydrocarbons having boiling points of butane and higher. The gas containing the highest concentration of butane and higher boiling recoverable hydrocarbons is introduced into the bottom of absorption tower 1 by means of line 2. Gases containing the lowest concentration of butanes and recoverable hydrocarbons are introduced into absorption tower 1 at a point nearest the point of introduction of the lean oil by means of feed line 3. Gases containing an intermediate concentration of butanes and recoverable hydrocarbons are introduced into absorption tower 1 at a point intermediate the point of introduction of the relatively rich hydrocarbon gas and the point of introduction of the relatively poor hydrocarbon gas by means of feed line 4. It is to be noted that the gases containing different concentrations of butanes and recoverable hydrocarbons are introduced into absorption tower 1 in a manner that the gases containing the lower concentrations are introduced at points nearest the point of introduction of the fresh lean oil. Feed gases introduced by means of feed lines 2, 3, and 4 may be compressed to the desired extent by means of compressors 5, 6, and 7 respectively. These gases may likewise be cooled to an optimum temperature by means of gas coolers 8, 9, and 10 respectively. The gases flow upwardly through absorption tower 1 and contact downflowing lean absorption oil which is introduced into absorption tower 1 from lean oil storage 11 by means of line 12 and pump 13. Efficient contact between the countercurrently flowing vapors and the lean oil is secured by suitable distributing and contacting means. Temperature and pressure conditions, as well as the respective gas feed rates and lean oil rates are so adjusted so as to effect the desired recovery of the key component. Since in an efficient tower substantial equilibrium is normally obtained at the bottom of the tower, the partial pressure of the key component in the hydrocarbon rich absorption oil at the point of withdrawal of the absorption oil is substantially equal to the partial pressure of the key component in relatively rich gas stream. The relatively poor hydrocarbon gases are introduced into the absorption tower at points at which the partial pressure of the key component in the respective gases is equivalent to the partial pressure of the key component in the rising gas stream in the tower at the point of introduction of said relatively poor hydrocarbon gases.

Scrubbed gases substantially free of butane and recoverable hydrocarbon vapors are removed from absorption tower 1 by means of line 14 and passed to a burning line or disposed of in any suitable manner. The hydrocarbon rich absorption oil containing the absorbed butanes and recoverable hydrocarbons is removed from absorption tower 1 by means of line 15 and handled in a manner adapted to recover the absorbed butanes and recoverable hydrocarbons from the absorption oil. This is preferably accomplished by passing the hydrocarbon rich absorption oil to a high pressure still 16 of a distillation unit by means of pump 17 and line 18. The high pressure still is operated at temperatures and pressures under which it is possible to permit the recycling of any gas from the reflux accumulator back to the absorber without any recompressing being necessary. Gases are removed overhead from distillation unit 16 by means of line 19, condensed in condenser 20 and then passed to reflux accumulator 21. Uncondensed gases are removed overhead from reflux accumulator 21 by means of line 22 and recycled into absorption tower 1. These gases are introduced into absorption tower 1 at a point at which the partial pressure of the key component in the gas is equivalent to the partial pressure of the key component in rising gas stream. Reflux is recycled to high pressure still 16 from reflux accumulator 21 by means of line 23 and pump 24. The desired temperature is maintained on high pressure still 16 by means of reboiler 25. Open steam may be introduced into high pressure still 16 by means of line 26. The amount of this steam may be adjusted to control the amount of recycle gas released from the still or to regulate the pressure on the still when no gas is released therefrom. Bottoms are withdrawn from high pressure still 16 by means of line 27, passed through a pressure release valve 28 and introduced into low pressure still 29 by means of line 30. The pressure maintained on low pressure still 29 is determined by an economical balance between the cost of recompressing the recycled gas released from the reflux accumulator 36 against the cost of open steam necessary to secure the desired stripping of the lean oil. The desired temperature is maintained in low pressure still 29 by means of reboiler 31. Open steam is introduced into low pressure still 29 by means of line 32. The operating conditions of low pressure still 29 are adjusted so that absorption oil substantially free of absorbed hydrocarbons is removed by means of line 33. This oil is recycled to absorption oil storage 11. Hydrocarbon vapors are removed overhead from low pressure still 29 by means of line 34, condensed in condenser 35 and passed to low pressure reflux accumulator 36. Uncondensed gases are removed overhead from reflux accumulator 36 by means of line 37 and recycled to absorption tower 1 in the manner described with respect to the uncondensed gases from reflux accumulator 21. Under certain conditions it may be desirable to combine the uncondensed gases and to introduce these gases at a single point in the absorption tower. This operation may be readily secured by adjusting valves 38, 39, and 40. Reflux is introduced into low pressure still 29 from reflux accumulator 36 by means of line 41 and pump 42. Condensed overhead from low pressure still 29 not utilized as reflux is recycled to reflux accumulator 21 by means of line 43 and pump 44. The recovered liquid hydrocarbon product is removed from the distillation system by means of line 45 from the bottom of reflux accumulator 21 and passed to storage 46. The recovered product may then be further processed or may be blended directly into motor fuels by means of line 47.

The process of the present invention may be widely varied. Any particular absorption oil may be employed, as well as an especially prepared gas oil or a gas oil which is to be subsequently cracked, as well as a heavy naphtha fraction known as debutanizer bottoms. The pressure on the absorber is determined by an economical balance between the cost of compressing the gases and the higher cost of pressure equipment against the cost of circulating larger quantities of lean oil. This is determined to some extent by the operating conditions of the refinery from which the gases to be processed are secured. In general, it is preferred to maintain a relatively low temperature on the absorber, in which case it is desirable to cool the incoming gases. Under certain conditions it may be desirable to provide the absorber with inter-coolers or other equivalent cooling means. For example, if the feed gases are of a sufficient high pressure to be introduced into the absorption tower without compressing, these gases may be readily by-passed around the compression units, as well as around the cooling units. This may be readily accomplished by means of manifolds around said units.

In order to further illustrate the present invention, the following example is given which should not be construed as limiting the same in any manner whatsoever:

*Example*

A low line gas at about atmospheric pressure secured from a crude still operation and containing a relatively high concentration of butanes and recoverable hydrocarbons was compressed to approximately 60 pounds gage. This gas was introduced into the bottom of an absorption tower. A high line gas secured from the distillate drums of a cracking operation under a pressure of 70 pounds gage and containing a relatively low concentration of butanes and recoverable hydrocarbons was passed directly into said absorption tower at a point between the point of introduction of said compressed low line gas and the point of introduction of the fresh lean oil. The high line gas was introduced at a point in said absorption tower at which partial pressure of butane in the rising gas stream was substantially equivalent to the partial pressure of the butane in said gas. The lean oil was introduced at the top of said absorption tower at a temperature in the range from about 50° F. to 70° F. A hydrocarbon rich absorption oil was withdrawn from said tower at a temperature in the range from about 70° F. to 100° F. The hydrocarbon rich oil was then introduced into a high pressure still maintained at a pressure of about 80 pounds gage. The temperature at the bottom of the high pressure still was maintained at about 350° F., while the temperature of the vapors leaving the high pressure still was about 200° F. The pressure of the low pressure still was about 5 pounds gage. The temperature at the bottom of low pressure still was maintained at about 350° F. and the temperature of the low pressure vapor line was about 160° F. It was found by the above mode of operation that an efficient operation was secured and that the capacity of the absorber was materially increased. The required amount of lean oil circulated was likewise substantially decreased per volume of gas being processed.

The above invention is not to be limited by any theory or mode of operation, but only by the following claims in which it is desired to claim all novelty insofar as the prior art permits.

1. Process for recovering hydrocarbon vapors from a plurality of segregated feed gas streams containing various substantial proportions of recoverable hydrocarbon vapors comprising introducing a suitable absorbing medium into the top of an absorption tower, introducing the segregated feed gas streams into said absorption tower at a plurality of points in a manner that a gas stream having a relatively lower concentration of recoverable hydrocarbons is introduced at a point between the point of introduction of the lean oil and the point of introduction of a gas stream having a relatively higher concentration of recoverable hydrocarbons, said gas streams being introduced into said absorption tower at points at which the partial pressure of the lowest boiling recoverable hydrocarbon in the rising gas stream is substantially equivalent to the partial pressure of the lowest boiling recoverable hydrocarbon in the respective segregated gas stream at the point of introduction, maintaining suitable temperature and pressure conditions on said tower to secure the maximum absorption of the recoverable hydrocarbon vapors with the minimum absorption of undesirable gases, removing the absorption oil containing the recoverable hydrocarbons from the bottom of said tower and separating the recovered hydrocarbons therefrom.

2. Process for recovering butane and higher boiling gasoline hydrocarbon vapors from a plurality of segregated feed gas streams containing various proportions of the same comprising introducing a high boiling petroleum absorption oil substantially free of butane and higher boiling gasoline hydrocarbons into the top of an absorption tower, introducing the segregated gas streams into the absorption tower at a plurality of points in a manner that a gas stream having a relatively lower concentration of butane and higher boiling hydrocarbons is introduced at a point between the point of introduction of the lean oil and the point of introduction of a gas stream having a relatively higher concentration of butane and higher boiling hydrocarbons, said gas streams being introduced into said absorption tower at points at which the partial pressure of the butane in the rising gas stream is substantially equivalent to the partial pressure of the butane in the respective segregated gas stream at the point of introduction, maintaining suitable temperature and pressure conditions on said tower to secure the maximum absorption of butane and higher boiling hydrocarbons with the minimum absorption of undesirable gases, removing the absorption oil containing butane and higher boiling gasoline hydrocarbons from said absorption tower and recovering the absorbed hydrocarbons therefrom.

3. Process for recovering hydrocarbon vapors from a plurality of segregated feed gas streams maintained under different pressures and containing various substantial proportions of recoverable hydrocarbon vapors comprising adjusting the respective pressures on said gas streams to the pressure maintained on an absorption tower, introducing a suitable absorbing medium into the top of said absorption tower, introducing the segregated gas streams into the absorption tower at a plurality of points in a manner that a gas stream having a relatively lower concentration of recoverable hydrocarbons is introduced at a point between the point of introduction of lean oil and the point of introduction of a gas stream having a relatively higher concentration of recoverable hydrocarbons said segregated gas streams being introduced into said absorption tower at points at which the partial pressure of the lowest boiling recoverable hydrocarbon in the rising gas stream is substantially equivalent to the partial pressure of the lowest boiling recoverable hydrocarbon in the segregated gas stream at the point of introduction, maintaining suitable temperature and pressure conditions on said tower to secure the maximum absorption of the recoverable hydrocarbon vapors with the minimum absorption of undesirable gases, removing the absorption oil containing the recoverable hydrocarbons from said absorption tower and recovering the hydrocarbons therefrom.

4. Process in accordance with claim 3 in which said recoverable hydrocarbons are butanes and higher boiling hydrocarbons.

5. Process for recovering butane and higher boiling recoverable hydrocarbon vapors from a plurality of segregated feed gas streams maintained under different pressures containing various proportions of the same comprising compressing the relatively low pressure gases to a pressure at which the highest pressure gas is maintained, cooling the respective segregated gas streams and introducing the same into a countercurrent oil absorption tower at a plurality of points in a manner that a gas stream having a relatively lower concentration of butane and higher boiling hydrocarbons is introduced at a point between the point of introduction of lean oil and the point of introduction of a gas stream having a relatively higher concentration of butane and higher boiling hydrocarbons, said segregated gas streams being introduced into said absorption tower at points at which the partial pressure of the butane in the rising gas stream is substantially equivalent to the partial pressure of the butane in the segregated gas stream at the point of introduction, maintaining suitable temperature and pressure conditions on said tower to secure the maximum absorption of the butane and higher boiling hydrocarbons with the minimium absorption of gases having boiling points below butane, removing the absorption oil containing the absorbed butane and higher boiling hydrocarbons from said absorption tower, recovering the absorbed hydrocarbon vapors therefrom as a liquid condensate and recycling uncondensed gases to said absorption tower.

PAUL E. KUHL.